United States Patent
Zeng et al.

(10) Patent No.: US 12,400,039 B2
(45) Date of Patent: Aug. 26, 2025

(54) DATA INTEGRITY PROTECTION METHOD AND APPARATUS

(71) Applicant: HUAWEI TECHNOLOGIES CO., LTD., Shenzhen (CN)

(72) Inventors: Xuehong Zeng, Shenzhen (CN); Yi Xia, Chengdu (CN); Heng Cai, Shenzhen (CN); Yongjin Cai, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 18/062,961

(22) Filed: Dec. 7, 2022

(65) Prior Publication Data

US 2023/0169216 A1    Jun. 1, 2023

Related U.S. Application Data

(63) Continuation of application No. PCT/CN2021/098744, filed on Jun. 7, 2021.

(30) Foreign Application Priority Data

Jun. 9, 2020    (CN) .......................... 202010518090.9

(51) Int. Cl.
H04L 29/06       (2006.01)
G06F 21/57       (2013.01)
(Continued)

(52) U.S. Cl.
CPC .......... *G06F 21/645* (2013.01); *G06F 21/575* (2013.01); *H04L 9/3073* (2013.01); *H04L 9/3247* (2013.01); *G06F 2221/034* (2013.01)

(58) Field of Classification Search
None
See application file for complete search history.

(56) References Cited

U.S. PATENT DOCUMENTS 7,984,286 B2 *   7/2011  Zimmer ................ G06F 21/575
                                                    713/176
8,281,115 B2 *  10/2012  Choi .................... H04L 9/0861
                                                    713/193

(Continued)

FOREIGN PATENT DOCUMENTS

CN      102656592 A     9/2012
CN      109446815 A     3/2019
WO      2014143009 A1   9/2014

*Primary Examiner* — Maung T Lwin
(74) *Attorney, Agent, or Firm* — Leydig, Voit & Mayer, Ltd.

(57) ABSTRACT

A data integrity protection method is applied to an electronic device, and the electronic device stores vendor data and first verification information. The first verification information is stored in a first storage area of the electronic device and is used to perform integrity verification on the vendor data. The method includes: First data is obtained. Digital signature is performed on the first data to generate second data and second verification information. The second data and the second verification information are stored, where the second verification information is stored in a second storage area of the electronic device. According to the data integrity protection method provided in this embodiment of this application, firmware or software customized by a third-party integrator is supported in being reloaded to a system for running, thereby simplifying a process and improving integrated development efficiency of an electronic device.

17 Claims, 8 Drawing Sheets

(51) Int. Cl.
　　　*G06F 21/64*　　　(2013.01)
　　　*H04L 9/30*　　　(2006.01)
　　　*H04L 9/32*　　　(2006.01)

(56) References Cited

U.S. PATENT DOCUMENTS

| | | | | |
|---|---|---|---|---|
| 8,812,854 | B2* | 8/2014 | Shah | H04L 9/30 |
| | | | | 713/176 |
| 8,966,248 | B2* | 2/2015 | Baltes | H04L 9/3247 |
| | | | | 713/176 |
| 9,525,555 | B2* | 12/2016 | Dewan | H04L 9/3242 |
| 10,482,252 | B2* | 11/2019 | Doliwa | G06F 21/44 |
| 2005/0235141 | A1* | 10/2005 | Ibrahim | H04L 9/0897 |
| | | | | 713/164 |
| 2014/0181498 | A1* | 6/2014 | Rhee | G06F 21/575 |
| | | | | 713/2 |
| 2016/0103994 | A1* | 4/2016 | Murakami | G06F 21/572 |
| | | | | 713/193 |
| 2018/0114013 | A1* | 4/2018 | Sood | G06F 21/606 |
| 2019/0087581 | A1* | 3/2019 | Kim | G06F 8/65 |
| 2019/0138730 | A1 | 5/2019 | Liu et al. | |
| 2020/0120077 | A1* | 4/2020 | Kumar | H04L 9/0894 |
| 2020/0252207 | A1* | 8/2020 | Hanel | H04L 9/083 |
| 2021/0406379 | A1* | 12/2021 | Lee | G06F 21/572 |

\* cited by examiner

DATA INTEGRITY PROTECTION METHOD AND APPARATUS

CROSS-REFERENCE TO RELATED APPLICATIONS

This application is a continuation of International Application No. PCT/CN2021/098744, filed on Jun. 7, 2021, which claims priority to Chinese Patent Application No. 202010518090.9, filed on Jun. 9, 2020. The disclosures of the aforementioned applications are hereby incorporated by reference in their entireties.

TECHNICAL FIELD

Embodiments of this application relate to the computing field, and in particular, to a data integrity protection method and a data integrity protection apparatus.

BACKGROUND

Firmware, software, and the like stored in a device may be attacked, and consequently may be tampered with or implanted with Trojan horses. This endangers device running security. To protect data such as firmware and software in a device, a trusted computing system usually uses a digital signature verification method.

Generally, when a device is powered on and started, firmware or software is started level by level starting from a system trusted root. Before starting lower-level firmware or software, integrity verification is performed on the firmware or software, and the firmware or software is started only after the integrity verification is successful.

With the development of communications technologies and refined division of labor, a co-construction system involving multiple vendors becomes more and more popular. After devices are delivered, third-party integrators may need to customize firmware or software to adapt to service requirements. Currently, the firmware or software customized by a third-party integrator cannot be reloaded to a system for running after delivery. The device needs to be returned to the original manufacturer for re-signing before loading. The process is complex, and device integration development efficiency is low.

SUMMARY

Embodiments of this application provide a data integrity protection method and a data integrity protection apparatus, to support reloading of firmware or software, customized by a third-party integrator, to a system for running, thereby improving integrated development efficiency of an electronic device.

According to a first aspect, an embodiment of this application provides a data integrity protection method. The method may be applied to an electronic device, and the electronic device stores vendor data and first verification information. The first verification information is stored in a first storage area of the electronic device and is used to perform integrity verification on the vendor data. The method includes: First data is obtained. Digital signature is performed on the first data to generate second data and second verification information. The second data and the second verification information are stored, where the second verification information is stored in a second storage area of the electronic device.

According to the data integrity protection method provided in the first aspect, the electronic device stores the vendor data and the first verification information after delivery, and the first verification information is stored in the first storage area of the electronic device and is used to perform integrity verification on the vendor data. After the electronic device is delivered from a factory, a third-party integrator may customize firmware or software, and may perform digital signature on the first data to generate second data and second verification information. The second verification information is stored in the second storage area of the electronic device. Because the first storage area and the second storage area respectively store verification information related to different subjects, based on verification information in at least one storage area of the first storage area and the second storage area, when the electronic device is powered on to perform secure boot, the firmware or software customized by the third-party integrator can be reloaded to the system for running, and the electronic device does not need to be returned to the factory for digital signature. In a scenario in which multiple vendors co-construct a system, a process is simplified, integrated development efficiency of an electronic device is improved, and multi-vendor cooperation efficiency is improved.

Optionally, in a possible implementation of the first aspect, both the first storage area and the second storage area are one-time write storage areas.

According to the data integrity protection method provided in this possible implementation, a risk that another subject tampers with the first storage area and the second storage area is avoided, and security performance of data integrity protection is improved.

Optionally, in a possible implementation of the first aspect, the first data includes data obtained after the third-party integrator modifies the vendor data, and that digital signature is performed on the first data, to generate second data and second verification information may include: a public-private key pair provided by a third-party integrator is obtained, and digital signature is performed on the first data based on a private key in the public-private key pair, to generate the second data and the second verification information. Alternatively, digital signature is performed on the first data based on a private key corresponding to the first verification information, to generate the second data and the second verification information.

According to the data integrity protection method provided in this possible implementation, the private key used when digital signature is performed on the first data can be flexibly set based on a customization requirement of the third-party integrator, thereby improving customization flexibility of the third-party integrator.

Optionally, in a possible implementation of the first aspect, the second verification information includes a secure boot policy and/or a root of trust, and the secure boot policy is used to indicate a rule for performing integrity verification on the second data.

Optionally, in a possible implementation of the first aspect, the secure boot policy is specifically used to indicate any one of the following terms: directly loading the first data; performing integrity verification on the second data by using the first verification information; performing integrity verification on the second data by using the second verification information; and performing integrity verification on the second data by using the first verification information or the second verification information.

According to the data integrity protection method provided in this possible implementation, the third-party integrator may flexibly set, based on a customization requirement, a rule for performing digital signature on the first data. Secure boot policies vary with digital signature rules. Subsequently, in a secure boot process of the electronic device, a rule for performing integrity verification on the second data may be determined based on the secure boot policy, thereby improving a data running speed and stability in the secure boot process.

Optionally, in a possible implementation of the first aspect, the method may further include: performing a write protection operation on the second storage area.

According to the data integrity protection method provided in this possible implementation, the second storage area can be locked, to prevent another subject from tampering with the second storage area, thereby improving security performance of data integrity protection.

Optionally, in a possible implementation of the first aspect, the second data may include first data, signature information corresponding to the first data, and integrity verification information corresponding to the first data.

Optionally, in a possible implementation of the first aspect, the integrity verification information corresponding to the first data may include at least one of the following terms: a certificate, a certificate chain, a public key used to perform digital signature on the first data, or a hash value of a public key used to perform digital signature on the first data.

According to a second aspect, an embodiment of this application provides a data integrity protection method, and the method includes: obtaining to-be-verified data, first verification information, and second verification information. The first verification information is stored in a first storage area of an electronic device, the second verification information is stored in a second storage area of the electronic device, and both the first storage area and the second storage area are one-time writing storage areas. Integrity verification is performed on the to-be-verified data based on at least one of the first verification information and the second verification information.

Optionally, in a possible implementation of the second aspect, the second verification information includes at least one of the following provided by a third-party integrator: a secure boot policy or a second root of trust, and the secure boot policy is used to indicate a rule for performing integrity verification on the to-be-verified data.

Optionally, in a possible implementation of the second aspect, that integrity verification is performed on the to-be-verified data based on the second verification information may include: determining whether to directly load the to-be-verified data based on a secure boot policy. If it is determined that the to-be-verified data is not directly loaded and integrity verification needs to be performed on the to-be-verified data, integrity verification is performed on the to-be-verified data based on the first verification information or the second verification information.

Optionally, in a possible implementation of the second aspect, if it is determined to directly load the to-be-verified data, the to-be-verified data is loaded and executed.

Optionally, in a possible implementation of the second aspect, the first verification information includes a first root of trust provided by a device provider, and the first root of trust includes a first root public key or a hash value of a first root public key.

Optionally, in a possible implementation of the second aspect, the secure boot policy is specifically used to indicate any one of the following terms: directly loading the to-be-verified data; performing integrity verification on the to-be-verified data by using the first verification information; performing integrity verification on the to-be-verified data by using the second verification information; and performing integrity verification on the to-be-verified data by using the first verification information or the second verification information.

Optionally, in a possible implementation of the second aspect, before performing integrity verification on the to-be-verified data based on at least one of the first verification information and the second verification information, the method may further include the following step: determining that the second storage area is in a write-protected state.

According to the data integrity protection method provided in this possible implementation, a risk that another subject tampers with the second storage area is avoided, and security performance of data integrity protection is improved.

Optionally, in a possible implementation of the second aspect, the method may further include: if it is determined that the second storage area is not in the write-protected state, performing a write protection operation on the second storage area.

Optionally, in a possible implementation of the second aspect, the method may further include: performing the write protection operation on the second storage area, which may include: generating prompt information, where the prompt information is used to indicate that the second storage area is not in the write-protected state. A write protection instruction is received, where the write protection instruction is used to instruct write protection on the second storage area. The write protection operation is performed on the second storage area based on the write protection instruction.

According to a third aspect, an embodiment of this application provides a data integrity protection apparatus. The apparatus may be applied to an electronic device, where the electronic device stores vendor data and first verification information, and the first verification information is stored in a first storage area of the electronic device and is used to perform integrity verification on the vendor data. The data integrity protection apparatus may include: an obtaining module, configured to obtain first data; a processing module, configured to perform digital signature on the first data to generate second data and second verification information; and a storage module, configured to store the second data and the second verification information, where the second verification information is stored in a second storage area of the electronic device.

Optionally, in a possible implementation of the third aspect, both the first storage area and the second storage area are one-time write storage areas.

Optionally, in a possible implementation of the third aspect, the first data includes data obtained after a third-party integrator modifies the vendor data. The processing module is specifically configured to obtain a public-private key pair provided by the third-party integrator; and perform digital signature on the first data based on a private key in the public-private key pair, to generate the second data and the second verification information; or perform digital signature on the first data based on a private key corresponding to the first verification information, to generate the second data and the second verification information.

Optionally, in a possible implementation of the third aspect, the second verification information includes a secure boot policy and/or a root of trust, and the secure boot policy is used to indicate a rule for performing integrity verification on the second data.

According to a fourth aspect, an embodiment of this application provides a data integrity protection apparatus. The apparatus may include: an obtaining module, configured to obtain to-be-verified data, first verification information, and second verification information, where the first verification information is stored in a first storage area of an electronic device, the second verification information is stored in a second storage area of the electronic device, and both the first storage area and the second storage area are one-time writing storage areas; and a processing module, configured to perform integrity verification on the to-be-verified data based on at least one of the first verification information and the second verification information.

Optionally, in a possible implementation of the fourth aspect, the second verification information includes at least one of the following provided by a third-party integrator: a secure boot policy or a second root of trust, and the secure boot policy is used to indicate a rule for performing integrity verification on the to-be-verified data.

Optionally, in a possible implementation of the fourth aspect, the processing module is specifically configured to: determine, based on the secure boot policy, whether to directly load the to-be-verified data; and if it is determined that the to-be-verified data is not directly loaded and integrity verification needs to be performed on the to-be-verified data, perform integrity verification on the to-be-verified data based on the first verification information or the second verification information.

Optionally, in a possible implementation of the fourth aspect, the first verification information includes a first root of trust provided by a device provider, and the first root of trust includes a first root public key or a hash value of a first root public key.

Optionally, in a possible implementation of the fourth aspect, the processing module is further configured to: before performing integrity verification on the to-be-verified data based on at least one of the first verification information and the second verification information, determine that the second storage area is in a write-protected state.

According to a fifth aspect, an embodiment of this application provides a data integrity protection apparatus, including a processor and a memory. The processor is configured to invoke a program stored in the memory, to perform the method provided in the first aspect or the second aspect.

According to a sixth aspect, an embodiment of this application provides an electronic device, including a processor and a memory. The processor is configured to invoke a program stored in the memory, to perform the method provided in the first aspect or the second aspect.

According to a seventh aspect, an embodiment of this application provides a computer-readable storage medium. The computer-readable storage medium stores instructions. When the instructions are run on a computer or a processor, the method provided in the first aspect or the second aspect is implemented.

According to an eighth aspect, an embodiment of this application provides a program product. The program product includes a computer program, the computer program is stored in a readable storage medium, at least one processor of a device can read the computer program from the readable storage medium, and the at least one processor executes the computer program to enable the device to implement the method provided in the first aspect or the second aspect.

DESCRIPTION OF EMBODIMENTS

The following describes embodiments of this application with reference to accompanying drawings.

First, concepts in embodiments of this application are described.

1. Digital Signature (Digital Signature)

A digital signature may also be referred to as a public key digital signature or an electronic signature, and is a method implemented by using a technology in the public key encryption field to verify whether digital information is valid and complete. A set of digital signature usually defines two complementary operations, one for signature and the other for verification.

2. Secure Boot (Secure Boot, Verified Boot)

Secure boot is a technology that allows only firmware or software signed by a specific subject (such as a device manufacturer) to run on a device. A core function of secure boot is to use a digital signature to check whether firmware or software is trusted. Secure boot may be based on a public key encryption algorithm, a digital signature algorithm, a hash algorithm, or the like. Hardware infrastructure on which secure boot depends may be referred to as a trusted root. The trusted root ensures integrity of the first instruction run by a platform, and may ensure integrity of a subsequently loaded object through digital signature verification. In this way, a trust chain is transferred to subsequent firmware or software level by level, and finally trust of the entire platform is built.

Figure 1:
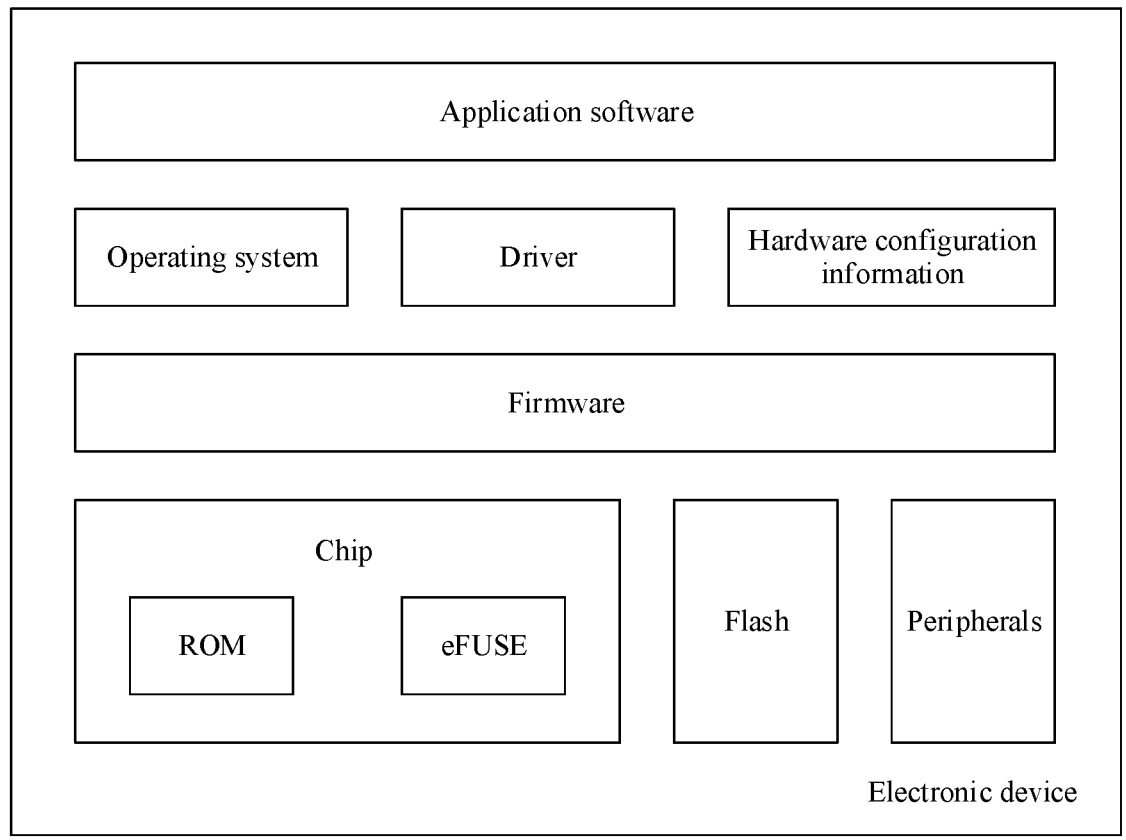
FIG. 1 is a schematic diagram of a hardware and software architecture of an electronic device to which an embodiment of this application is applicable.

Firmware, software, and the like stored in an electronic device may be attacked, and consequently may be tampered with or implanted with Trojan horses. This endangers device running security. To ensure running security of the electronic device, a digital signature verification method is usually used. For example, FIG. 1 is a schematic diagram of a hardware and software architecture of an electronic device to which an embodiment of this application is applicable. As shown in FIG. 1, a hardware part of the electronic device may include but is not limited to a chip, a flash memory, and a peripheral. A software part of the electronic device may include but is not limited to firmware, an operating system, a driver, hardware configuration information, and application software. The chip may include a memory. A quantity, a type, and stored specific content of the memory are not limited in this embodiment of this application. For example, referring to FIG. 1, in an electronic device that supports secure boot, the chip may include a read-only memory (ROM) and a one-time electrical programmable fuse (eFUSE). The ROM may store trusted boot code. The eFUSE is used to write unchangeable data at a time. For example, the data may include verification information used for digital signature verification in secure boot. Optionally, the eFUSE may further store configuration information. For example, the configuration information may include but is not limited to at least one of the following: a power voltage used by the chip, and a version number and a production date of the chip. The flash memory can store persistent data such as a software package. In the electronic device, the firmware (FW) refers to a programmable software part in a hardware component, and is usually software that is written into an erasable read only memory (EROM) or an erasable programmable read-only memory (EPROM) and that works at a most basic and bottom layer of a system, and the software can be upgraded. Optionally, the firmware may include but is not limited to bootloader firmware and unified extensible firmware interface (UEFI) firmware. The operating system, the driver, and the hardware configuration information may constitute a running platform of the application software. The application software refers to software used to implement various specific functions. The application software is also referred to as an application program.

It should be noted that in embodiments of this application, the "electronic device" may also be referred to as a "device".

It should be noted that, in embodiments of this application, "firmware and software stored in the electronic device" have a same meaning as "firmware or software stored in the electronic device", and include data running in secure boot of the electronic device, for example, may include at least one of the firmware, the operating system, the driver, or the hardware configuration information in FIG. 1.

It should be noted that a specific component included in the peripheral is not limited in this embodiment of this application. Components included in the peripheral may vary with a type of the electronic device.

It should be noted that other software or hardware further included in the electronic device is not limited in this embodiment of this application.

Figure 2:
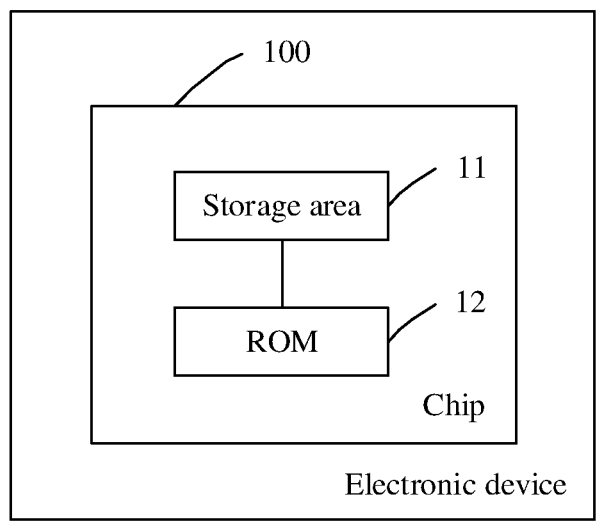
FIG. 2 is a schematic diagram of a structure of an electronic device.
Figure 3:
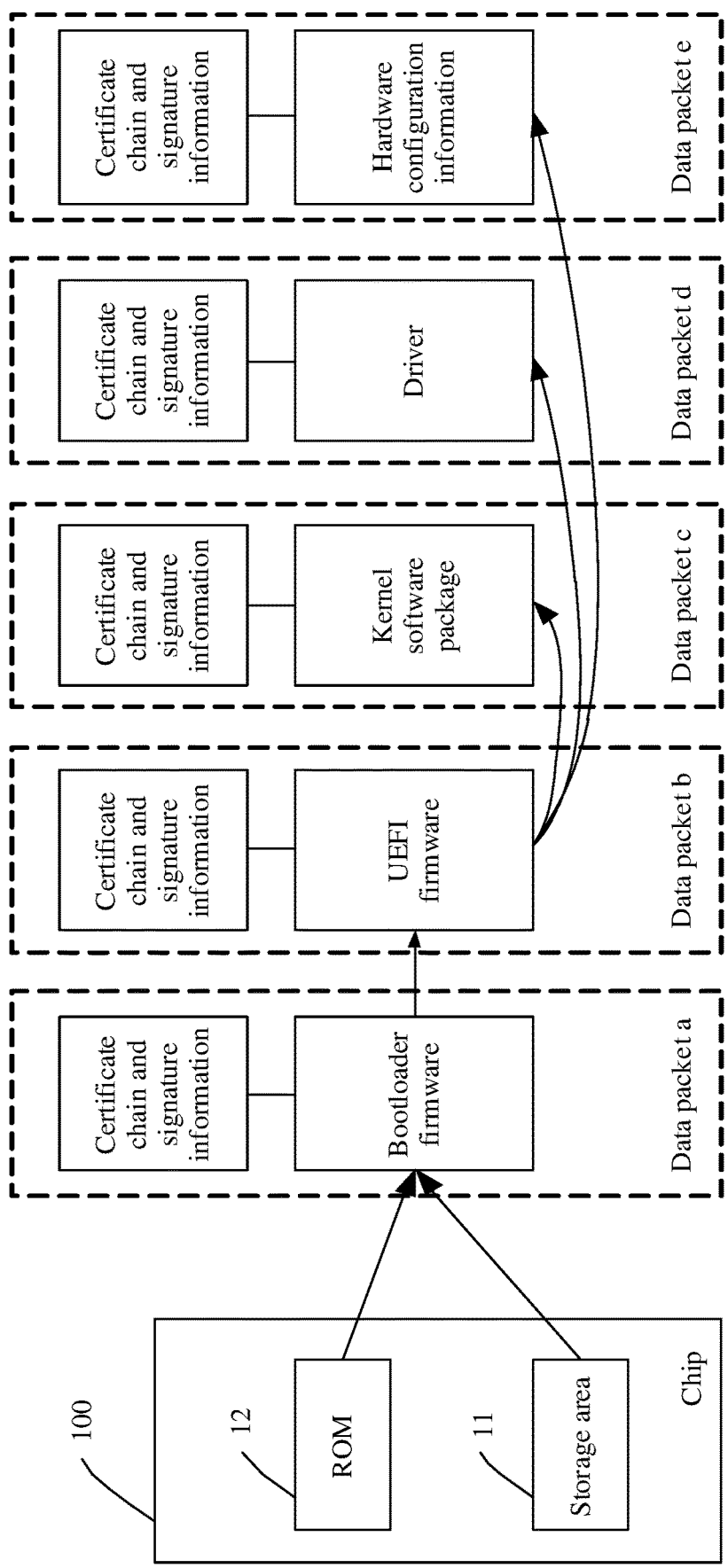
FIG. 3 is a schematic diagram of a principle of secure boot of an electronic device.

With reference to FIG. 1 to FIG. 3, the following describes a digital signature process and a secure boot process of an electronic device by using an example A and an example B, but does not constitute a limitation on the digital signature process and the secure boot process of the electronic device. For example, FIG. 2 is a schematic diagram of a structure of an electronic device, and FIG. 3 is a schematic diagram of a principle of secure boot of the electronic device. As shown in FIG. 2, the electronic device may include a chip 100, and the chip 100 may include a storage area 11 and an ROM 12. The storage area 11 is a one-time writing storage area. For the chip 100, the storage area 11, and the ROM 12, respectively refer to descriptions about the chip, the eFUSE, and the ROM in FIG. 1. Principles are similar, and details are not described herein again. In Example A and Example B, firmware and software stored in the electronic device may include bootloader firmware, UEFI firmware, a kernel software package, a driver, and hardware configuration information.

Example A

First, an example of a digital signature process before delivery of the electronic device is described. The electronic device may perform the following operations.

1.1. A segment of unchangeable trusted boot code is burnt into the ROM 12 of the chip 100.

1.2. A root public key A and a root private key A that are provided by a device provider are obtained, and the root public key A or a hash value of the root public key A is written into the storage area 11 of the chip 100. Compared with writing the root public key A, writing the hash value of the root public key A saves storage space. In this example, for description, the hash value of the root public key A is written.

Write protection is performed on the storage area 11, and the storage area 11 is locked, to prevent another subject from tampering with the storage area 11.

1.3. A level-2 public key B and a level-2 private key B that are provided by the device provider are obtained. In this example, digital signature is performed on the firmware or software by using the level-2 private key B.

1.4. Digital signature is performed on the bootloader firmware.

The bootloader firmware is signed by using the level-2 private key B, to generate signature information corresponding to the bootloader firmware.

The level-2 public key B is signed by using the root private key A, to generate a certificate chain corresponding to the bootloader firmware. The certificate chain includes a level-2 public key B signed by using the root private key A, and further includes the root public key A or the hash value of the root public key A. In this example, the hash value of the root public key A is included.

The bootloader firmware, the signature information corresponding to the bootloader firmware, and the certificate chain corresponding to the bootloader firmware are packaged and stored in the electronic device, and may be referred to as a data packet a.

1.5. By using a method similar to that in section 1.4, digital signature is performed in sequence on the UEFI firmware, the kernel software package, the driver, and the hardware configuration information that are then packaged and stored.

The UEFI firmware, signature information corresponding to the UEFI firmware, and a certificate chain corresponding to the UEFI firmware are packaged, and the package may be referred to as a data packet b.

The kernel software package, signature information corresponding to the kernel software package, and a certificate chain corresponding to the kernel software package are packaged, and the package may be referred to as a data packet c.

The driver, signature information corresponding to the driver, and a certificate chain corresponding to the driver are packaged, and the package may be referred to as a data packet d.

The hardware configuration information, signature information corresponding to the hardware configuration information, and a certificate chain corresponding to the hardware configuration information are packaged, and the package may be referred to as a data packet e.

The following describes an example of a secure boot process after delivery of the electronic device.

After the electronic device is powered on, firmware or software in the data packet a to the data packet e is started level by level from trusted start code in the ROM. Before starting lower-level firmware or software, integrity verification needs to be performed on the firmware or software, and the firmware or software is started only after the integrity verification is successful. Specifically, the electronic device may perform the following operations.

2.1. Boot from the boot code stored in the ROM 12 of the chip 100.

2.2. The boot code reads the hash value of the root public key A provided by the device provider from the storage area 11. For ease of description, the read root public key A may be referred to as a root public key A'.

2.3. The boot code reads the certificate chain corresponding to the bootloader firmware in the data packet a and obtains a root public key A through parsing. For ease of description, the root public key A obtained through parsing may be referred to as a root public key A".

2.4. Check whether the root public key A provided by the device provider is tampered with.

Specifically, whether the hash value of the root public key A' is the same as a hash value of the root public key A" is compared.

Case 1: If the hash value of the root public key A' is the same as the hash value of the root public key A", the root public key A provided by the device provider is not tampered with. In this case, 2.5 is performed.

Case 2: If the hash value of the root public key A' is different from the hash value of the root public key A", the root public key A provided by the device provider may be tampered with. In this case, the boot is stopped.

2.5. Check whether the level-2 public key B provided by the device provider is tampered with.

Specifically, the boot code reads the certificate chain corresponding to the bootloader firmware in the data packet a, and obtains, through parsing, the level-2 public key B signed by using the root private key A. For ease of description, the level-2 public key B obtained through parsing may be referred to as a level-2 public key B'. Verification is performed on the level-2 public key B' by using the root public key A' or the root public key A".

Case 1: If the verification is successful, the level-2 public key B provided by the device provider is not tampered with. In this case, 2.6 is performed.

Case 2: If the verification fails, the level-2 public key B provided by the device provider may be tampered with. In this case, the boot is stopped.

2.6. Integrity verification is performed on the bootloader firmware.

Specifically, integrity verification is performed on the bootloader firmware based on the level-2 public key B' and the signature information corresponding to the bootloader firmware.

Case 1: If the verification is successful, the bootloader firmware is not tampered with. In this case, the bootloader firmware is loaded and executed.

Case 2: If the verification fails, the bootloader firmware may be tampered with. In this case, the boot is stopped.

2.7. Subsequently, by using a method similar to that in 2.3 to 2.6, the bootloader firmware may perform integrity verification on the UEFI firmware, and the UEFI firmware may perform integrity verification on the kernel software package, the driver, and the hardware configuration information, to perform secure boot level by level, thereby implementing secure boot of the electronic device.

Example B

A difference between this example and Example A lies in that different private keys are used to perform digital signature verification on the firmware and the software, and correspondingly, different public keys are used to perform digital signature verification on the firmware and the software. In example A, the level-2 private key B and the level-2 public key B provided by the device provider are respectively used for digital signature and verification. In this example, the root private key A and root public key A provided by the device provider are respectively used for digital signature and verification.

In this example, a same step sequence number is used for steps that are the same as those in Example A, and different step sequence numbers are used for steps that are different from those in Example A and are described in detail.

In this example, for a digital signature process, the electronic device may perform steps 1.1 and 1.2, and 1.3' and 1.4'.

1.3'. Digital signature is performed on the bootloader firmware.

The bootloader firmware is signed by using the root private key A, to generate signature information corresponding to the bootloader firmware.

The certificate chain corresponding to the bootloader firmware may include the root public key A or the hash value of the root public key A. In this example, the hash value of the root public key A is included.

The bootloader firmware, the signature information corresponding to the bootloader firmware, and the certificate chain corresponding to the bootloader firmware are packaged and stored in the electronic device, and may be referred to as a data packet a.

1.4'. By using a method similar to that in 1.3', digital signature is performed in sequence on the UEFI firmware, the kernel software package, the driver, and the hardware configuration information that are then packaged and stored, to separately form a data packet b to a data packet e.

For the secure boot process, the electronic device may perform steps 2.1 and 2.2, and 2.3' to 2.6'.

2.3'. The boot code reads the certificate chain corresponding to the bootloader firmware in the data packet a and obtains the root public key A through parsing. For ease of description, the root public key A obtained through parsing may be referred to as a root public key A".

2.4'. Check whether the root public key A provided by the device provider is tampered with.

Specifically, whether the hash value of the root public key A' is the same as a hash value of the root public key A" is compared.

Case 1: If the hash value of the root public key A' is the same as the hash value of the root public key A", the root public key A provided by the third-party integrator is not tampered with. In this case, 2.5' is performed.

Case 2: If the hash value of the root public key A' is different from the hash value of the root public key A", the root public key A provided by the device provider may be tampered with. In this case, the boot is stopped.

2.5'. Integrity verification is performed on the bootloader firmware.

Specifically, integrity verification is performed on the bootloader firmware based on the root public key A' or the root public key A" and the signature information corresponding to the bootloader firmware.

Case 1: If the verification is successful, the bootloader firmware is not tampered with. In this case, the bootloader firmware is loaded and executed.

Case 2: If the verification fails, the bootloader firmware may be tampered with. In this case, the boot is stopped.

2.6'. Subsequently, by using a method similar to that in 2.3' to 2.5', the bootloader firmware may perform integrity verification on the UEFI firmware, and the UEFI firmware may perform integrity verification on the kernel software package, the driver, and the hardware configuration information, to perform secure boot level by level, thereby implementing secure boot of the electronic device.

With the development of communications technologies and refined division of labor, a co-construction system involving multiple vendors becomes more and more popular. After a device is delivered from a factory, to adapt to a service requirement, a third-party integrator may customize firmware or software, for example, add new firmware or software, or modify default firmware or software in an electronic device. Currently, firmware or software customized by a third-party integrator cannot be reloaded to a system for running after delivery. The device needs to be returned to the device provider for re-signing before loading and running the customized firmware or software. The process is complex, and device integration development efficiency is low, which is unfavorable to multi-vendor cooperation.

Figure 4:
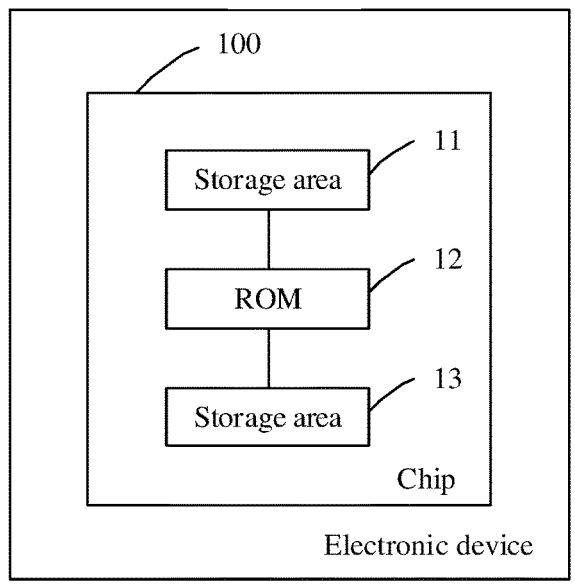
FIG. 4 is a schematic diagram of a structure of an electronic device to which an embodiment of this application is applicable.

For the foregoing technical problem, an embodiment of this application provides a data integrity protection method. Refer to FIG. 4. FIG. 4 is a schematic diagram of a structure of an electronic device to which an embodiment of this application is applicable. The electronic device may include a chip 100, and the chip 100 may include a storage area 11, an ROM 12, and a storage area 13. For the chip 100, the storage area 11, and the ROM 12, respectively refer to the chip 100, the storage area 11, and the ROM 12 in FIG. 2. Principles are similar, and details are not described herein again. When the electronic device is delivered from a factory, the electronic device stores default firmware or software and verification information used to perform integrity verification on the default firmware or software. The verification information is stored in a storage area of the electronic device, for example, the storage area 11. After the electronic device is delivered from a factory, digital signature is performed on firmware or software that needs to be customized by a third-party integrator, and corresponding verification information is stored in another storage area of the electronic device, for example, a storage area 13. Because the storage area 11 and the storage area 13 separately store verification information related to different subjects, based on verification information in at least one storage area of the storage area 11 and the storage area 13, when the electronic device is powered on to perform secure boot, the firmware or software customized by third-party integrators can be reloaded to the system for running, and the electronic device does not need to be returned to the factory for digital signature. In a scenario in which multiple vendors co-construct a system, a process is simplified, integrated development efficiency of an electronic device is improved, and multi-vendor cooperation efficiency is improved.

It should be noted that a type and an application scenario of the electronic device are not limited in this embodiment of this application. For example, the electronic device may be any device applied to the computing or communications field, for example, a computer, a mobile phone, a router, a switch, or an intelligent device. The electronic device may be applied to the artificial intelligence (AI) field. Device providers may provide AI module hardware, firmware, operating system, and some AI application software. Third-party integrators may integrate AI modules into a bottom board, expand peripherals, add drivers for the peripherals, and modify an operating system kernel and AI application software based on customization requirements. For example, in an application scenario, the electronic device may be an AI edge computing device.

It should be noted that names of the device provider and the third-party integrator are not limited in this embodiment of this application. For example, the device provider may also be referred to as a device provider, a first device body, or a first vendor, and the third-party integrator may also be referred to as a third-party integrator, a second device body, or a second vendor.

It should be noted that a quantity of storage areas included in the electronic device is not limited in this embodiment of this application. When there are more than two storage areas, the storage areas may be in a one-to-one correspondence with different subjects, or one subject may correspond to at least one storage area. For example, there are three storage areas, which are referred to as storage areas 1 to 3. In an implementation, the storage areas 1 to 3 separately store verification information related to vendors 1 to 3. In another implementation, the storage areas 1 and 2 may store verification information related to a vendor 1, and the storage area 3 may store verification information related to a vendor 2.

It should be noted that names of the storage area and the verification information are not limited in this embodiment of this application. For ease of description, in embodiments of this application, a storage area related to a device provider may be referred to as a first storage area, and verification information stored in the first storage area may be referred to as first verification information. A storage area related to a third-party integrator may be referred to as a second storage area, and verification information stored in the second storage area may be referred to as second verification information.

By using specific embodiments, the following describes in detail the technical solutions of this application and how to resolve the foregoing technical problem by using the technical solutions of this application. The following several specific embodiments may be combined with each other, and a same or similar concept or process may not be described repeatedly in some embodiments.

Figure 5:
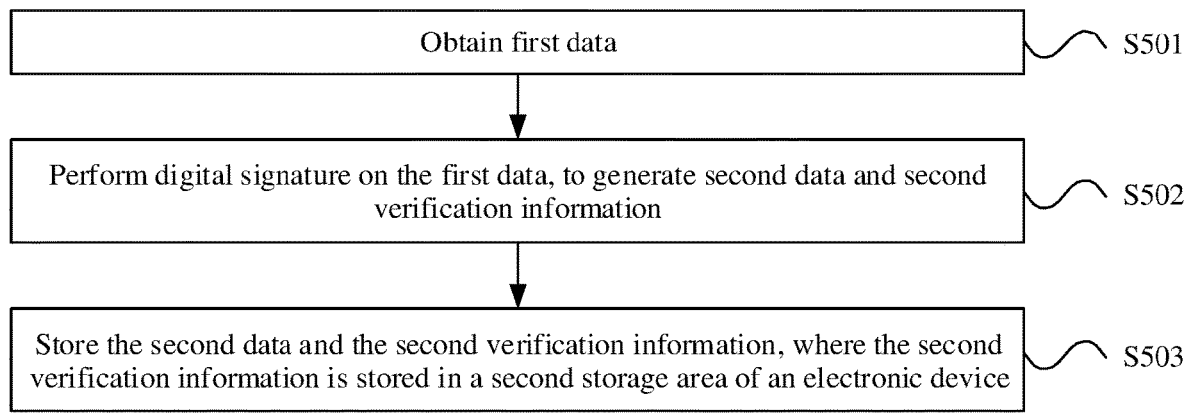
FIG. 5 is a flowchart of a data integrity protection method according to an embodiment of this application.

FIG. 5 is a flowchart of a data integrity protection method according to an embodiment of this application. The data integrity protection method provided in this embodiment may be applied to a phase in which a third-party integrator performs integrated development after delivery of an electronic device, and may be executed by a data integrity protection apparatus or the electronic device. For ease of description, each method embodiment of this application is described by using the electronic device as an execution body. The electronic device stores vendor data and the first verification information, and the first verification information is stored in the first storage area of the electronic device and is used to perform integrity verification on the vendor data. The vendor data may include firmware or software stored when the electronic device is delivered from a factory. It should be noted that a name of the vendor data is not limited in this embodiment. For example, the vendor data may also be referred to as "default data" or "default firmware or software". The first verification information may include a first root of trust provided by a device provider. The first root of trust may include a first root public key, or include a hash value of a first root public key, or include other information related to a first root public key. It should be noted that, in embodiments of this application, for ease of description, the root of trust included in the first verification information may be referred to as a first root of trust, the root public key provided by the device provider may be referred to as the first root public key, and a root private key corresponding to the first root public key may be referred to as a first root private key. For a digital signature process of the electronic device before delivery, refer to the foregoing example A or example B. Details are not described herein again. As shown in FIG. 5, the data integrity protection method provided in this embodiment of this application may include the following steps.

S501: Obtain first data.

The first data may include firmware or software customized by a third-party integrator. The firmware or software customized by the third-party integrator may be obtained by modifying the vendor data in the electronic device. The data obtained after the third-party integrator modifies the vendor data may be obtained by modifying partial data or all data in the vendor data, or may be obtained by adding new firmware or software based on the vendor data.

The following describes the first data by using an example with reference to FIG. 3, but does not constitute a limitation on the first data.

Example 1: UEFI firmware includes a first data packet and a second data packet, and the third-party integrator needs to modify the first data packet. In this case, the first data may include a modified first data packet and the unmodified second data packet.

Example 2: UEFI firmware includes a first data packet and a second data packet, and a driver includes a third data packet and a fourth data packet. The third-party integrator needs to modify the first data packet and the fourth data packet. In this case, the first data may include a modified first data packet and the unmodified second data packet, and the unmodified third data packet and a modified fourth data packet.

Example 3: The UEFI firmware includes a first data packet and a second data packet, and the third-party integrator needs to add a new third data packet based on the first data packet. In this case, the first data may include the unmodified first data packet, the unmodified second data packet, and a newly added third data packet.

S502: Perform digital signature on the first data, to generate second data and second verification information.

The second data may include the first data, signature information corresponding to the first data, and integrity verification information corresponding to the first data. In this embodiment, the integrity verification information corresponding to the first data may include at least one of the following: a certificate, a certificate chain, a public key used to perform digital signature on the first data, or a hash value of a public key used to perform digital signature on the first data.

The second verification information is used to perform integrity verification on the second data in a secure boot process after the electronic device is powered on. In this embodiment, the second verification information may include at least one of the following: a secure boot policy or a second root of trust. The secure boot policy is used to indicate a rule for performing integrity verification on the second data. The second root of trust may include a second root public key provided by the third-party integrator, or include a hash value of a second root public key, or include other information related to a second root public key. It should be noted that, in embodiments of this application, for ease of description, a root of trust included in the second verification information may be referred to as the second root of trust, a root public key provided by the third-party integrator may be referred to as the second root public key, and a root private key corresponding to the second root public key may be referred to as a second root private key. The secure boot policy or the second root of trust may be provided by the third-party integrator.

A used digital signature algorithm is not limited in this embodiment, and may be any digital signature algorithm, for example, related descriptions in the foregoing Example A or Example B.

A private key used for digital signature is not limited in this embodiment, and different used private keys correspond to different secure boot policies.

For example, digital signature may be performed on the first data by using the second root private key corresponding to the second root public key provided by the third-party integrator. The secure boot policy may be used to indicate to perform integrity verification on the second data by using the second verification information. Alternatively, the secure boot policy may be used to indicate to use the first verification information or the second verification information to perform integrity verification on the second data.

For another example, digital signature may be performed on the first data by using the first root private key corresponding to the first root public key provided by the device provider. The secure boot policy may be used to indicate to perform integrity verification on the second data by using the first verification information. Alternatively, the secure boot policy may be used to indicate to use the first verification information or the second verification information to perform integrity verification on the second data.

It should be noted that firmware or software stored in the electronic device has levels, and each piece of firmware or software is started level by level in a secure boot process after the electronic device is powered on. For example, in FIG. 3, the firmware and software stored in the electronic device include bootloader firmware, UEFI firmware, a kernel software package, a driver, and hardware configuration information. The firmware or software customized by the third-party integrator can involve at least one level. If the firmware or the software customized by the third-party integrator relates to at least two levels, that is, the first data relates to at least two levels, digital signature is separately performed on the firmware or the software at each level. An example is used for description. Referring to the foregoing Case 2, the first data relates to two levels: the UEFI firmware and the driver. That digital signature is performed on the first data may include the following steps: Digital signature is performed on the modified first data packet and the unmodified second data packet, to generate corresponding second data. Digital signature is performed on the unmodified third data packet and the modified fourth data packet to generate corresponding second data.

S503: Store the second data and the second verification information. The second verification information is stored in a second storage area of the electronic device.

For example, for the first storage area, refer to the storage area 11 in FIG. 4. For the second storage area, refer to the storage area 13 in FIG. 4. Principles are similar, and details are not described herein again.

It can be seen that, according to the data integrity protection method provided in this embodiment, the electronic device stores vendor data and first verification information after delivery, and the first verification information is stored in a first storage area of the electronic device and is used to perform integrity verification on the vendor data. After the electronic device is delivered from a factory, a third-party integrator may customize firmware or software, and may perform digital signature on the first data to generate second data and second verification information. The second verification information is stored in a second storage area of the electronic device. Because the first storage area and the second storage area respectively store verification information related to different subjects, based on verification information in at least one storage area of the first storage area and the second storage area, when the electronic device is powered on to perform secure boot, firmware or software customized by a third-party integrator can be reloaded to the system for running, and the electronic device does not need to be returned to the factory for digital signature. In a scenario in which multiple vendors co-construct a system, a process is simplified, integrated development efficiency of an electronic device is improved, and multi-vendor cooperation efficiency is improved.

Optionally, in S502, that digital signature is performed on the first data, to generate second data and second verification information may include the following steps.

A public-private key pair provided by the third-party integrator is obtained.

Digital signature is performed on the first data based on a private key in the public-private key pair to generate the second data and the second verification information.

Alternatively, digital signature is performed on the first data based on a private key corresponding to the first verification information to generate the second data and the second verification information.

Specifically, the private key used when digital signature is performed on the first data can be flexibly set based on a customization requirement of the third-party integrator, thereby improving customization flexibility of the third-party integrator. In an implementation, a private key used when digital signature is performed on the first data is related to the third-party integrator, and is specifically a private key provided by the third-party integrator. For example, referring to the digital signature process in Example A, the public-private key pair provided by the third-party integrator may include a second root private key and a second root public key, and may further include a level-2 public-private key pair. Digital signature may be performed on the first data based on the level-2 private key in the level-2 public-private key pair provided by the third-party integrator. For another example, referring to the digital signature process in Example B, the public-private key pair provided by the third-party integrator may include a second root private key and a second root public key, and digital signature may be performed on the first data based on the second root private key provided by the third-party integrator. In another implementation, the private key used when the digital signature is performed on the first data is related to the device provider, and is specifically the private key corresponding to the first verification information, that is, the first root private key provided by the device provider.

In this embodiment, to improve security performance of data integrity protection, both the first storage area and the second storage area are one-time writing storage areas. The one-time writing storage area is used for writing unchangeable data at a time, thereby avoiding a risk that another subject tampers with the first storage area and the second storage area. An implementation of writing to the storage area at a time is not limited in this embodiment. For example, both the first storage area and the second storage area are eFUSEs. For another example, the first storage area and the second storage area may be two one-time writing storage areas in a same memory. For another example, the first storage area and the second storage area are respectively one-time write storage areas in different memories.

Optionally, the data integrity protection method provided in this embodiment of this application may further include the following steps.

A write protection operation is performed on the second storage area.

Write protection is performed on the second storage area, so that the second storage area can be locked, to prevent another subject from tampering with the second storage area, thereby improving security of secure boot of the electronic device.

Figure 6:
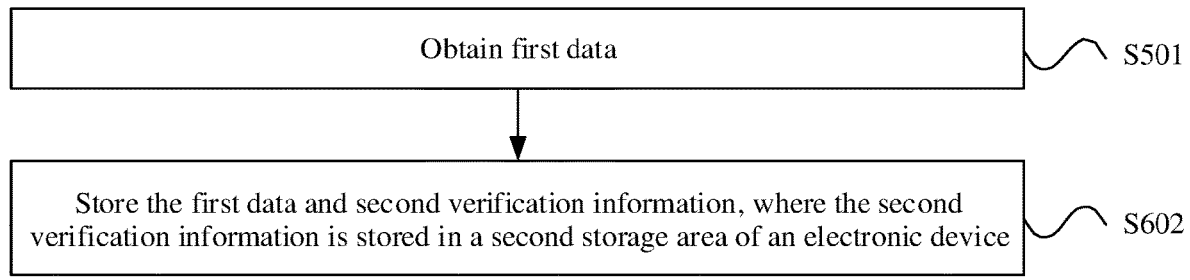
FIG. 6 is another flowchart of a data integrity protection method according to an embodiment of this application.

FIG. 6 is another flowchart of a data integrity protection method according to an embodiment of this application. The data integrity protection method provided in this embodiment may be applied to a phase in which a third-party integrator performs integrated development after an electronic device is delivered from a factory, and may be executed by a data integrity protection apparatus or the electronic device. A difference between this embodiment and the embodiment shown in FIG. 5 lies in that, in the embodiment shown in FIG. 5, digital signature needs to be performed on the first data. However, in this embodiment, it may be determined that the first data is trusted, and digital signature may not be performed on the first data. Correspondingly, in a secure boot process after the electronic device is powered on, the first data may be directly loaded and run.

In this embodiment, a same step sequence number is used for steps that are the same as those in the embodiment shown in FIG. 5. Different step sequence numbers are used for steps that are different from those in the embodiment shown in FIG. 5, and the steps are described in detail.

As shown in FIG. 6, the data integrity protection method provided in this embodiment of this application may include the following steps.

S501: Obtain first data.

S602: Store the first data and second verification information. The second verification information is stored in a second storage area of the electronic device.

The second verification information is used to perform integrity verification on the second data in a secure boot process after the electronic device is powered on. In this embodiment, because it may be determined that the first data is trusted, subsequently, in the secure boot process after the electronic device is powered on, the first data may be directly loaded and run. In this case, the second verification information may include a secure boot policy, and the secure boot policy may be used to indicate to directly load the first data, or may be used to indicate to use first verification information to perform integrity verification on the second data.

It can be seen that, according to the data integrity protection method provided in this embodiment, the electronic device stores vendor data and the first verification information after delivery, and the first verification information is stored in a first storage area of the electronic device and is used to perform integrity verification on the vendor data. After the electronic device is delivered from a factory, a third-party integrator may customize firmware or software.

In a scenario in which it can be determined that the customized firmware or software is trusted, digital signature may not be performed on the first data, and the second verification information may be stored in the second storage area of the electronic device. Because the first storage area and the second storage area respectively store verification information related to different subjects, based on verification information in at least one storage area of the first storage area and the second storage area, when the electronic device is powered on to perform secure boot, the firmware or software customized by the third-party integrator can be reloaded to the system for running, and the electronic device does not need to be returned to the factory for digital signature. In a scenario in which multiple vendors co-construct a system, a process is simplified, integrated development efficiency of an electronic device is improved, and multi-vendor cooperation efficiency is improved.

It should be noted that the embodiment shown in FIG. 5 and the embodiment shown in FIG. 6 may be combined with each other in some scenarios. In this case, the first data relates to at least two levels. Based on a requirement of a third-party integrator, digital signature may be or may not be performed on firmware or software at different levels.

Based on the embodiments shown in FIG. 5 and FIG. 6, with reference to FIG. 4, the data integrity protection method provided in this embodiment of this application is described in the following by using Example C. For example, in this example, when the electronic device is delivered from a factory, vendor data may include bootloader firmware, UEFI firmware, a kernel software package, a driver, and hardware configuration information, and all of these are digitally signed by using a root private key A (that is, a first root private key) provided by a device provider. First verification information may include a hash value of a root public key A (that is, a first root public key) provided by the device provider, and is stored in a storage area 11 (that is, a first storage area) of the electronic device. For example, a third-party integrator needs to modify the UEFI firmware and driver. It should be noted that specific content included in first data, second data, and second verification information is not limited in this example.

Example C

The data integrity protection method provided in this example may include the following steps.

3.1. First data is obtained.

Because a third-party integrator needs to modify UEFI firmware and a driver of an electronic device at delivery, the first data relates to two levels in firmware or software. For ease of description, the UEFI firmware of the electronic device at delivery is referred to as first UEFI firmware, and UEFI firmware customized by a third-party integrator is referred to as second UEFI firmware. The second UEFI firmware includes an unmodified part in the first UEFI firmware and a modified part in the first UEFI firmware. Similarly, the driver of the electronic device at delivery is referred to as a first driver, a driver customized by a third-party integrator is referred to as a second driver, and the second driver includes an unmodified part in the first driver and a modified part in the first driver. The first data may include the second UEFI firmware and the second driver.

3.2. Digital signature is performed on the first data, to generate second data and second verification information.

For example, in this example, based on a requirement of the third-party integrator, digital signature needs to be performed on the second UEFI firmware by using a root private key C (that is, a second root private key) provided by the third-party integrator, and digital signature does not need to be performed on the second driver.

Digital signature is performed on the second UEFI firmware by using the root private key C provided by the third-party integrator, to generate signature information corresponding to the second UEFI firmware. In addition, the second UEFI firmware, the signature information corresponding to the second UEFI firmware, and the integrity verification information corresponding to the second UEFI firmware are packaged into second data, which may be referred to as a data packet b'. Integrity verification information corresponding to the second UEFI firmware may include a hash value of a root public key C (that is, a second root public key), and the root public key C corresponds to the root private key C.

The second verification information may include a secure boot policy and a second root of trust. The secure boot policy is used to indicate to use the second verification information to perform integrity verification on the second UEFI firmware, and the second driver may be directly loaded. The second root of trust may include the hash value of the root public key C.

3.3. The second data and the second verification information are stored.

Specifically, the data packet b' and the second driver are stored in the electronic device, and the second verification information is written into a storage area 13.

3.4. Write protection is performed on the storage area 13, and the storage area 13 is locked, to prevent another subject from tampering with the storage area 13.

Figure 7:
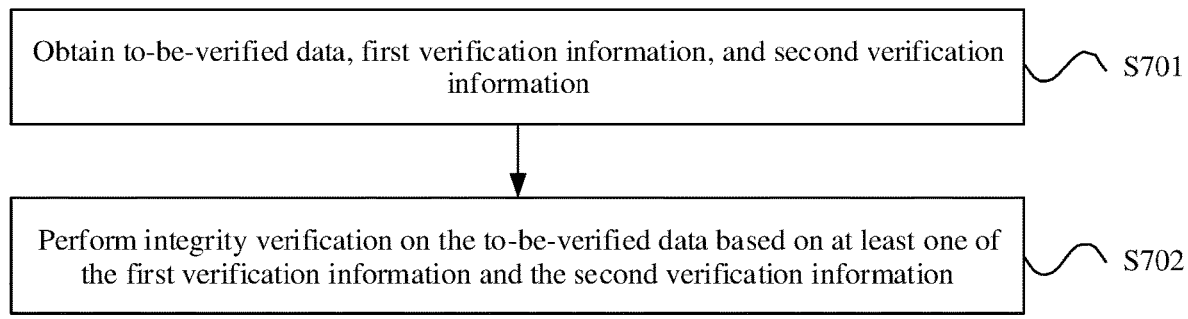
FIG. 7 is still another flowchart of a data integrity protection method according to an embodiment of this application.

FIG. 7 is still another flowchart of a data integrity protection method according to an embodiment of this application. The data integrity protection method provided in this embodiment may be applied to a secure boot process after an electronic device is powered on, and may be executed by a data integrity protection apparatus or the electronic device. As shown in FIG. 7, the data integrity protection method provided in this embodiment of this application may include the following steps.

S701: Obtain to-be-verified data, first verification information, and second verification information.

The first verification information is stored in a first storage area of the electronic device, and the second verification information is stored in a second storage area of the electronic device. Both the first storage area and the second storage area are one-time writing storage areas.

For example, for the first storage area, refer to the storage area 11 in FIG. 4. For the second storage area, refer to the storage area 13 in FIG. 4. Principles are similar, and details are not described herein again.

Specific content included in the to-be-verified data is not limited in this embodiment. Optionally, the to-be-verified data may include default firmware or software of the electronic device at delivery. For example, the to-be-verified data may include at least one of a boot code firmware package, a UEFI firmware package, a kernel software package, a driver, and hardware configuration information in FIG. 3, and signature information and a certificate chain corresponding to the boot code firmware package, the UEFI firmware package, the kernel software package, the driver, and the hardware configuration information. For example, the to-be-verified data may include a UEFI firmware package, and signature information and a certificate chain that correspond to the UEFI firmware package. For another example, the to-be-verified data may include a UEFI firmware package, signature information and a certificate chain that correspond to the UEFI firmware package, a kernel software package, and signature information and a certificate chain that correspond to the kernel software package. Optionally, the to-be-verified data may include firmware or software customized by a third-party integrator after the electronic device is delivered from a factory. Optionally, the to-be-verified data may include any combination of default firmware or software in the electronic device and firmware or software customized by a third-party integrator.

In this embodiment, the first verification information may include a first root of trust provided by a device provider, and the first root of trust may include the first root public key, or include a hash value of a first root public key, or include other information related to a first root public key.

In this embodiment, the second verification information includes at least one of the following terms provided by the third-party integrator: a secure boot policy or a second root of trust. The secure boot policy is used to indicate a rule for performing integrity verification on the to-be-verified data, and the second root of trust may include a second root public key, or include a hash value of a second root public key, or include other information related to a second root public key.

In this embodiment, the secure boot policy may be used to indicate any one of the following terms:
  directly loading the to-be-verified data;
  performing integrity verification on the to-be-verified data by using the first verification information;
  performing integrity verification on the to-be-verified data by using the second verification information; and
  performing integrity verification on the to-be-verified data by using the first verification information or the second verification information.

In this embodiment, the first storage area may be in a write-protected state. It is determined that the first storage area is in the write-protected state, so that a risk that the first storage area is maliciously tampered with can be avoided, and security of secure boot of the electronic device is further improved.

S702: Perform integrity verification on the to-be-verified data based on at least one of the first verification information and the second verification information.

It can be learned that according to the data integrity protection method provided in this embodiment, both the first storage area and the second storage area of the electronic device are one-time writing storage areas, thereby avoiding a risk that the storage area is tampered with, and improving security performance of data integrity protection. In addition, the first storage area stores the first verification information, the second storage area stores the second verification information, and subjects related to the first verification information and the second verification information are different. When the electronic device is powered on to perform secure boot, integrity verification is performed by using double verification information. If integrity verification performed on the to-be-verified data by using at least one of the first verification information and the second verification information succeeds, integrity of the to-be-verified data in the electronic device can be ensured. This implements secure boot of an electronic device in a multi-vendor co-construction system scenario. According to the data integrity protection method provided in this embodiment, firmware or software customized by a third-party integrator can be directly loaded to a system for running, and an electronic device does not need to be returned to a factory for digital signature again. In a scenario in which multiple vendors co-construct a system, a process is simplified, integrated development efficiency of an electronic device is improved, and multi-vendor cooperation efficiency is improved.

It should be noted that an execution sequence of performing integrity verification on the to-be-verified data based on the first verification information and performing integrity verification on the to-be-verified data based on the second verification information in S702 is not limited in this embodiment. Integrity verification may be first performed on the to-be-verified data based on the first verification information, or integrity verification may be first performed on the to-be-verified data based on the second verification information. Details are described in the following.

In a first implementation, integrity verification is first performed on the to-be-verified data based on the first verification information. Specifically, in S702, that integrity verification is performed on the to-be-verified data based on at least one of the first verification information and the second verification information may include steps 4.1 to 4.3.

4.1. Integrity verification is performed on the to-be-verified data by using the first verification information.

If integrity verification performed on the to-be-verified data by using the first verification information does not succeed, 4.2 is performed.

If integrity verification performed on the to-be-verified data by using the first verification information succeeds, 4.3 is performed.

4.2. Integrity verification is performed on the to-be-verified data by using the second verification information.

If integrity verification performed on the to-be-verified data by using the second verification information succeeds, 4.3 is performed.

If integrity verification performed on the to-be-verified data by using the second verification information does not succeed, boot is stopped.

4.3. The to-be-verified data is loaded and executed.

In a second implementation, integrity verification is first performed on the to-be-verified data based on the second verification information. Specifically, in S702, that integrity verification is performed on the to-be-verified data based on at least one of the first verification information and the second verification information may include steps 5.1 to 5.3.

5.1. Integrity verification is performed on the to-be-verified data by using the second verification information.

If integrity verification performed on the to-be-verified data by using the second verification information does not succeed, 5.2 is performed.

If integrity verification performed on the to-be-verified data by using the second verification information succeeds, 5.3 is performed.

5.2. Integrity verification is performed on the to-be-verified data by using the first verification information.

If integrity verification performed on the to-be-verified data by using the first verification information succeeds, 5.3 is performed.

If integrity verification performed on the to-be-verified data by using the first verification information does not succeed, boot is stopped.

5.3. The to-be-verified data is loaded and executed.

In the first implementation and the second implementation, that integrity verification is performed on the to-be-verified data based on the second verification information may include:

Whether to directly load the to-be-verified data is determined based on the secure boot policy.

If it is determined that the to-be-verified data is not directly loaded and integrity verification needs to be performed on the to-be-verified data, integrity verification is performed on the to-be-verified data based on the first verification information or the second verification information.

If it is determined to directly load the to-be-verified data, the to-be-verified data is loaded and executed.

Specifically, based on different customization requirements of a third-party integrator, there may be the following two scenarios in a secure boot process of the electronic device. In a first scenario, the to-be-verified data can be directly loaded to improve a loading speed. In a second scenario, integrity verification needs to be performed on the to-be-verified data and the data can be loaded and run only after the verification is successful, thereby improving running security. When it is determined to be the second scenario, integrity verification is performed on the to-be-verified data by using the first verification information or the second verification information. When it is determined to be the first scenario, the to-be-verified data is directly loaded and executed.

According to the data integrity protection method, in S702, before integrity verification is performed on the to-be-verified data based on at least one of the first verification information and the second verification information, the method may include the following steps.

Whether the second storage area is in the write-protected state is determined.

If the second storage area is in the write-protected state, the step of performing integrity verification on the to-be-verified data based on at least one of the first verification information and the second verification information is performed.

Specifically, to prevent a third-party integrator from forgetting to lock the second storage area, and in particular, to prevent a third-party integrator that does not need customization from forgetting to lock the second storage area, whether the second storage area is in the write-protected state is first determined before integrity verification is performed on the to-be-verified data. If the second storage area is in the write-protected state, a malicious attacker does not tamper with the second verification information stored in the second storage area, and an operation of performing integrity verification on the to-be-verified data may continue to be performed.

The data integrity protection method provided in this embodiment may further include the following steps.

If it is determined that the second storage area is not in the write-protected state, a write protection operation is performed on the second storage area.

The write protection operation is performed on the second storage area, so that the second storage area can be prevented from being maliciously tampered with, thereby improving security of secure boot of the electronic device.

That the write protection operation is performed on the second storage area may include the following steps.

Prompt information is generated. The prompt information is used to indicate that the second storage area is not in the write-protected state.

A write protection instruction is received, where the write protection instruction is used to instruct write protection on the second storage area.

The write protection operation is performed on the second storage area based on the write protection instruction.

It should be noted that an implementation of the prompt information is not limited in this embodiment. Optionally, the prompt information may include any one of the following:

text information or voice information.

Figure 8:
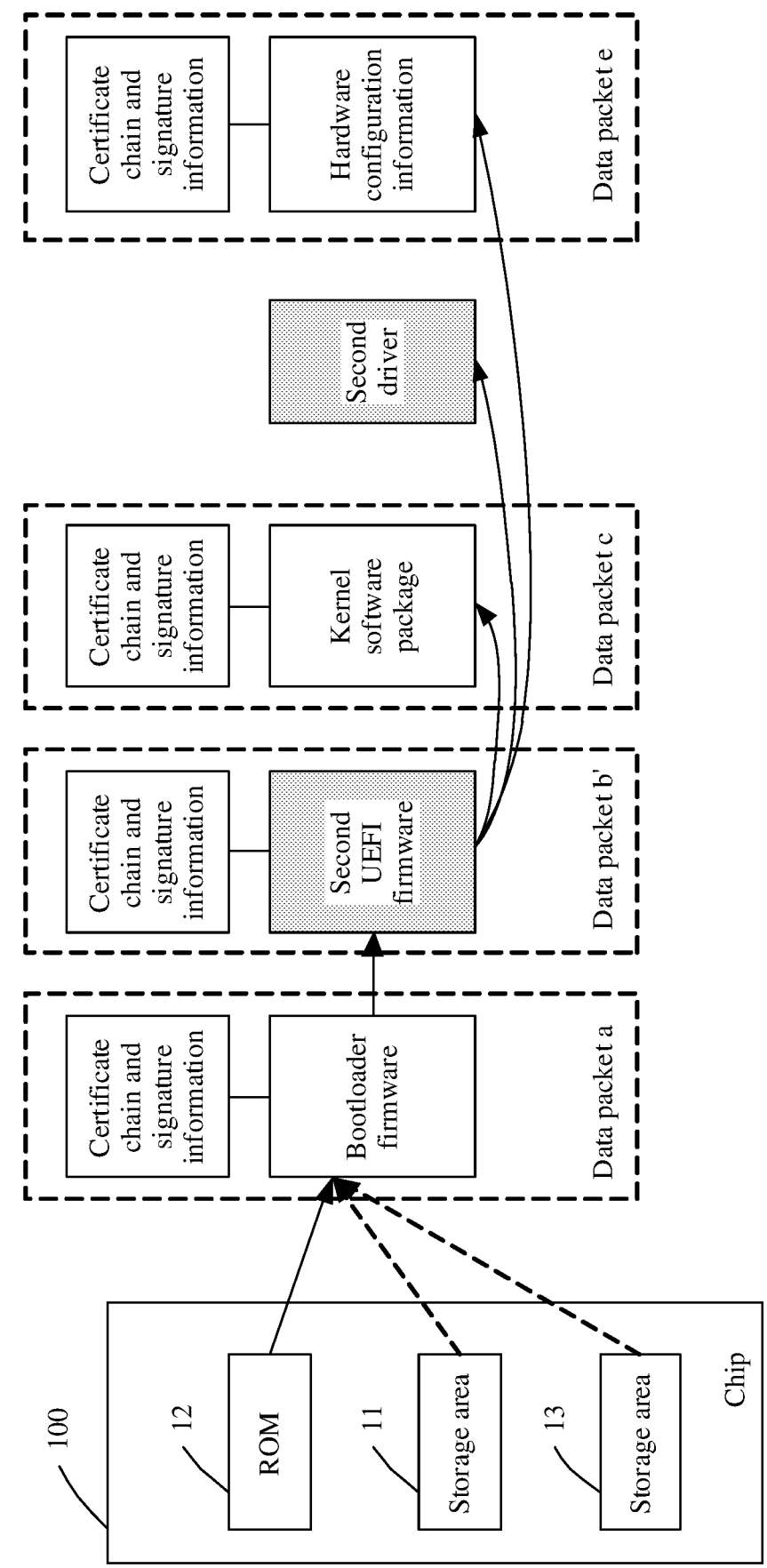
FIG. 8 is a schematic diagram of a principle of secure boot of an electronic device according to an embodiment of this application.

Based on the embodiment shown in FIG. 7, with reference to FIG. 4 and FIG. 8, the data integrity protection method provided in this embodiment of this application is described by using example D. This example corresponds to Example B and Example C above. FIG. 8 is a schematic diagram of a principle of secure boot of an electronic device according to an embodiment of this application. In FIG. 8, the electronic device may include a chip 100, and the chip 100 may include a storage area 11, an ROM 12, and a storage area 13. The storage area 11 is a first storage area, and the storage area 13 is a second storage area. In this example, when the electronic device is delivered from a factory, vendor data may include: bootloader firmware, UEFI firmware, a kernel software package, a driver, and hardware configuration information, and all of these are digitally signed by using a root private key A (that is, a first root private key) provided by a device provider. After the electronic device is delivered from the factory, a third-party integrator modifies the UEFI firmware and the driver of the electronic device at delivery, to separately form second UEFI firmware and a second driver. Digital signature is performed on the second UEFI firmware by using a root private key C (that is, a second root private key) provided by the third-party integrator, and digital signature is not performed on the second driver. In this example, second verification information is stored in the storage area 13, and includes a secure boot policy and a second root of trust. The secure boot policy is used to indicate to use the second verification information to perform integrity verification on the second UEFI firmware, and the second driver may be directly loaded. The second root of trust may include a hash value of a root public key C (that is, a second root public key). First verification information is stored in the storage area 11, and includes a hash value of a root public key A (that is, a first root public key). It is assumed that in an integrity verification process, integrity verification is first performed on to-be-verified data based on the first verification information, and if the verification fails, integrity verification is then performed on the to-be-verified data based on the second verification information.

Example D

After the electronic device is powered on, the data integrity protection method provided in this embodiment may include the following steps.

6.1. Boot from boot code stored in the ROM 12 of the chip 100.

6.2. The boot code reads the hash value of the root public key A provided by the device provider from the storage area 11.

The start code reads the second verification information from the storage area 13.

6.3. To-be-verified data is obtained. The to-be-verified data includes bootloader firmware and signature information and a certificate chain that correspond to the bootloader firmware.

6.4. Integrity verification is first performed on the to-be-verified data based on the first verification information.

Specifically, a certificate chain corresponding to the bootloader firmware in a data packet a is read, and a root public key A is obtained through parsing. For ease of description, the root public key A obtained through parsing may be referred to as a root public key A". The root public key A read from the storage area 11 may be referred to as a root public key A'.

Whether the hash value of the root public key A' is the same as a hash value of the root public key A" is compared. Assuming that the hash value of the root public key A' is the same as that of the root public key A", and the root public key A provided by the device provider is not tampered with, integrity verification is performed on the bootloader firmware based on the root public key A' or the root public key A", and the signature information corresponding to the bootloader firmware.

If the verification is successful, the bootloader firmware is not tampered with. In this case, the bootloader firmware is loaded and executed.

6.5. To-be-verified data is obtained. The to-be-verified data includes the second UEFI firmware, and signature information and a certificate chain (integrity verification information) that correspond to the second UEFI firmware.

6.6. Integrity verification is first performed on the to-be-verified data based on the first verification information.

Because digital signature is performed on the second UEFI firmware by using the root private key C (that is, the second root private key) provided by the third-party integrator, the verification fails.

6.7. Integrity verification is then performed on the to-be-verified data based on the second verification information.

The secure boot policy is used to indicate to use the second verification information to perform integrity verification on the second UEFI firmware, and the certificate chain corresponding to the second UEFI firmware in a data packet b' is read to obtain a root public key C through parsing. For ease of description, the root public key obtained through parsing may be referred to as a root public key C". A root public key read from the storage area 13 may be referred to as a root public key C'.

Whether a hash value of the root public key C' is the same as a hash value of the root public key C" is compared. Assuming that the hash value of the root public key C' is the same as that of the root public key C", and the root public key C provided by the third-party integrator is not tampered with, integrity verification is performed on the second UEFI firmware based on the root public key C' or the root public key C", and the signature information corresponding to the second UEFI firmware.

If the verification is successful, it indicates that the second UEFI firmware is not tampered with, and the second UEFI firmware is loaded and executed.

6.8. To-be-verified data is obtained. The to-be-verified data includes the kernel software package and signature information and a certificate chain that correspond to the kernel software package.

6.9. Integrity verification is first performed on the to-be-verified data based on the first verification information.

For details, refer to the description in 6.4. Principles are similar, and details are not described herein again.

6.10. To-be-verified data is obtained. The to-be-verified data includes the second driver.

6.11. Integrity verification is first performed on the to-be-verified data based on the first verification information.

Because no digital signature is performed on the second driver, the verification fails.

6.12. Integrity verification is then performed on the to-be-verified data based on the second verification information.

If it is determined, based on the secure boot policy, that the second driver can be directly loaded, the second driver is directly loaded and executed.

6.13. To-be-verified data is obtained. The to-be-verified data includes the hardware configuration information and a certificate chain and signature information that correspond to the hardware configuration information.

6.14. Integrity verification is first performed on the to-be-verified data based on the first verification information.

For details, refer to the description in 6.4. Principles are similar, and details are not described herein again.

Figure 9:
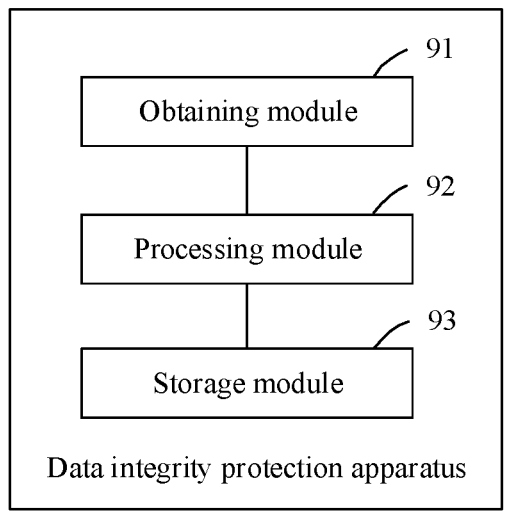
FIG. 9 is a schematic diagram of a structure of a data integrity protection apparatus according to an embodiment of this application.

FIG. 9 is a schematic diagram of structure of a data integrity protection apparatus according to an embodiment of this application. As shown in FIG. 9, the data integrity protection apparatus provided in this embodiment may be applied to an electronic device. The electronic device stores vendor data and first verification information, and the first verification information is stored in a first storage area of the electronic device and is used to perform integrity verification on the vendor data. The apparatus includes:

an obtaining module 91, configured to obtain first data;
    a processing module 92, configured to perform digital signature on the first data to generate second data and second verification information; and
    a storage module 93, configured to store the second data and the second verification information, where the second verification information is stored in a second storage area of the electronic device.

Optionally, both the first storage area and the second storage area are one-time writing storage areas.

Optionally, the first data includes data obtained after a third-party integrator modifies the vendor data, and the processing module 92 is specifically configured to:

obtain a public-private key pair provided by the third-party integrator; and
    perform digital signature on the first data by using a private key in the public-private key pair to generate the second data and the second verification information; or
    perform digital signature on the first data based on a private key corresponding to the first verification information to generate the second data and the second verification information.

Optionally, the second verification information includes a secure boot policy and/or a root of trust, and the secure boot policy is used to indicate a rule for performing integrity verification on the second data.

The data integrity protection apparatus provided in this embodiment may perform the data integrity protection method provided in the embodiment shown in FIG. 5 or FIG. 6 of this application. Technical principles and technical effects are similar, and details are not described herein again.

Figure 10:
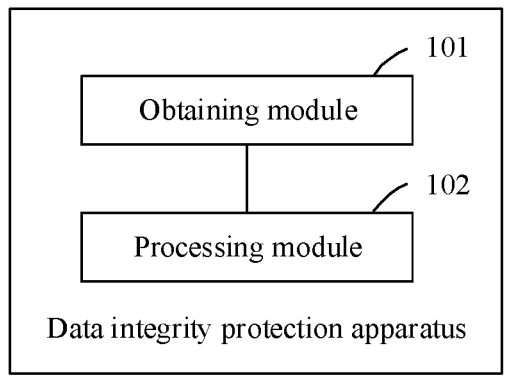
FIG. 10 is another schematic diagram of a structure of a data integrity protection apparatus according to an embodiment of this application.

FIG. 10 is another schematic diagram of a structure of a data integrity protection apparatus according to an embodiment of this application. As shown in FIG. 10, the data integrity protection apparatus provided in this embodiment of this application may include:

an obtaining module 101, configured to obtain to-be-verified data, first verification information, and second verification information, where the first verification information is stored in a first storage area of an electronic device, the second verification information is stored in a second storage area of the electronic device, and both the first storage area and the second storage area are one-time writing storage areas; and a processing module 102, configured to perform integrity verification on the to-be-verified data based on at least one of the first verification information and the second verification information.

Optionally, the second verification information includes at least one of the following provided by a third-party integrator: a secure boot policy or a second root of trust, and the secure boot policy is used to indicate a rule for performing integrity verification on the to-be-verified data.

Optionally, the processing module 102 is specifically configured to:

determine, based on the secure boot policy, whether to directly load the to-be-verified data; and if it is determined that the to-be-verified data is not directly loaded and integrity verification needs to be performed on the to-be-verified data, perform integrity verification on the to-be-verified data based on the first verification information or the second verification information.

Optionally, the first verification information includes a first root of trust provided by a device provider, and the first root of trust includes a first root public key or a hash value of a first root public key.

Optionally, the processing module 102 is further configured to:

before performing integrity verification on the to-be-verified data based on at least one of the first verification information and the second verification information, determine that the second storage area is in a write-protected state.

The data integrity protection apparatus provided in this embodiment may perform the data integrity protection method provided in the embodiment shown in FIG. 7 of this application. Technical principles and technical effects are similar, and details are not described herein again.

Figure 11:
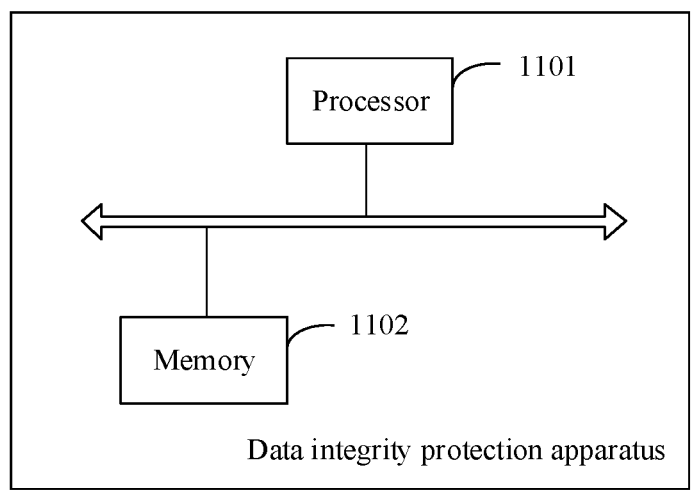
FIG. 11 is still another schematic diagram of a structure of a data integrity protection apparatus according to an embodiment of this application.

FIG. 11 is still another schematic diagram of a structure of a data integrity protection apparatus according to an embodiment of this application. As shown in FIG. 11, the data integrity protection apparatus provided in this embodiment may include a processor 1101 and a memory 1102. The memory 1102 is configured to store instructions, and the processor 1101 is configured to execute the instructions stored in the memory 1102, to perform the data integrity protection method provided in any embodiment of FIG. 5 to FIG. 7 of this application. Technical principles and technical effects are similar, and details are not described herein again.

Figure 12:
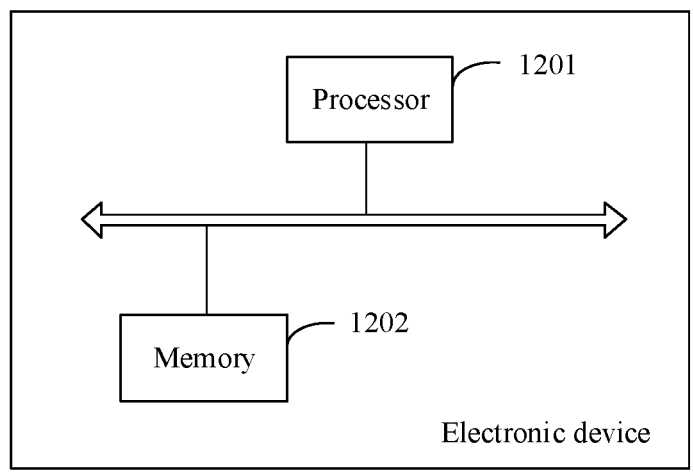
FIG. 12 is a schematic diagram of a structure of an electronic device according to an embodiment of this application.

FIG. 12 is a schematic diagram of a structure of an electronic device according to an embodiment of this application. As shown in FIG. 12, the electronic device provided in this embodiment may include a processor 1201 and a memory 1202. The memory 1202 is configured to store instructions, and the processor 1201 is configured to execute the instructions stored in the memory 1202. Technical principles and technical effects of the data integrity protection method provided in any embodiment in FIG. 5 to FIG. 7 of this application are similar, and details are not described herein again.

It should be understood that the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, such as a hard disk drive (HDD) or a solid-state drive (SSD), or may be a volatile memory, such as a random access memory (RAM). The memory is any medium that can carry or store expected program code in a form of an instruction or a data structure and can be accessed by a computer, but is not limited thereto. The memory in embodiments of this application may alternatively be a circuit or any other apparatus that can implement a storage function, and is configured to store the program instructions and/or the data.

What is claimed is:

1. A data integrity protection method, applied to an electronic device, wherein the electronic device stores vendor data and first verification information, the first verification information is stored in a first storage area of the electronic device and the vendor data is stored on the electronic device, the first verification information is used to perform integrity verification on the vendor data, the first verification information includes a hash value of a first root public key that corresponds to a first root private key provided by a device provider of the electronic device, the vendor data includes first unified extensible firmware interface (UEFI) firmware, and the method comprises:

obtaining first data that includes second UEFI firmware;

performing digital signature on the first data to generate second data and second verification information by using a second root private key provided by a third-party integrator;

obtaining the second verification information corresponding to the digital signature, wherein the second verification information includes a hash value of a second root public key and a secure boot policy that is used to indicate using the second verification information to perform integrity verification on the second UEFI firmware, the second root public key corresponding to the second root private key;

storing the second data and the second verification information, wherein the second verification information is stored in a second storage area of the electronic device and the second data is stored on the electronic device;

obtaining to-be-verified data that includes the second UEFI firmware and a certificate chain that corresponds to the second UEFI firmware; and in response to failing to perform integrity verification on the to-be-verified data by comparing the hash value of the first root public key of the first verification information to a hash value from a root public key parsed from the certificate chain:

executing and loading the second UEFI firmware in response to performing the integrity verification on the to-be-verified data by comparing the hash value from the root public key parsed from the certificate chain to the hash value of the second root public key of the second verification information.

2. The method according to claim 1, wherein both the first storage area and the second storage area are one-time writing storage areas.

3. The method according to claim 1, wherein the first data comprises data obtained after the third-party integrator modifies the vendor data, and the performing digital signature on the first data to the generate second data comprises:

obtaining a public-private key pair provided by the third-party integrator; and performing digital signature on the first data based on a private key in the public-private key pair to generate the second data.

4. The method according to claim 1, wherein the secure boot policy is used to indicate a rule for performing the integrity verification on the second data.

5. The method according to claim 1, wherein the second verification information comprises a root of trust.

6. The method according to claim 1, wherein the first verification information includes a first root of trust provided by the device provider and the second verification information includes a second root of trust provided by the third-party integrator.

7. The method according to claim 1, wherein the second data includes the first data.

8. A data integrity protection method, applied to an electronic device, wherein the electronic device stores vendor data and first verification information, the first verification information is stored in a first storage area of the electronic device and the vendor data is stored on the electronic device, the first verification information being used to perform integrity verification on the vendor data, the first verification information including a hash value of a first root public key that corresponds to a first root private key provided by a device provider of the electronic device, the vendor data including first unified extensible firmware interface (UEFI) firmware and a first driver, and the method comprising:

obtaining first data that includes second UEFI firmware and a second driver;

performing digital signature on the second UEFI firmware of the first data but not the second driver to generate second data and second verification information by using a second root private key provided by a third-party integrator;

obtaining the second verification information corresponding to the digital signature, wherein the second verification information includes a hash value of a second root public key and a secure boot policy that is used to indicate using the second verification information to perform integrity verification on the second driver, the second root public key corresponding to the second root private key;

storing the second data and the second verification information, wherein the second verification information is stored in a second storage area of the electronic device and the second data is stored on the electronic device, wherein both the first storage area and the second storage area are one-time writing storage areas;

obtaining to-be-verified data that includes the second driver; and in response to failing to perform integrity verification on the to-be-verified by the first verification information based on no digital signature being performed for the second driver:

executing and loading the second driver in response to performing the integrity verification on the to-be-verified data based on the secure boot policy of the second verification information.

9. The method according to claim 8, wherein the second verification information comprises at least one of the following provided by the third-party integrator: a root of trust, and the secure boot policy is used to indicate a rule for performing integrity verification on the to-be-verified data.

10. The method according to claim 8, wherein before the performing integrity verification on the to-be-verified data based on at least one of the first verification information and the second verification information, the method further comprises:

determining that the second storage area is in a write-protected state.

11. A data integrity protection apparatus, comprising an electronic device, wherein the electronic device stores vendor data and first verification information, the first verification information is stored in a first storage area of the electronic device and the vendor data is stored on the electronic device, and the first verification information is used to perform integrity verification on the vendor data, the first verification information includes a hash value of a first root public key that corresponds to a first root private key provided by a device provider of the electronic device, the vendor data includes first unified extensible firmware interface (UEFI) firmware, and wherein the electronic device comprises:

a memory; and a processor coupled to the memory and configured to execute instructions to:

obtain first data that include second UEFI firmware;

perform digital signature on the first data to generate second data and second verification information by using a second root private key provided by a third-party integrator wherein the second verification information corresponds to the digital signature, wherein the second verification information includes a hash value of a second root public key and a secure boot policy that is used to indicate using the second verification information to perform integrity verification on the second UEFI firmware, the second root public key corresponding to the second root private key;

store the second data and the second verification information, wherein the second verification information is stored in a second storage area of the electronic device and the second data is stored on the electronic device;

obtain to-be-verified data that includes the second UEFI firmware and a certificate chain that corresponds to the second UEFI firmware; and in response to failing to perform integrity verification on the to-be-verified data by comparing the hash value of the first root public key of the first verification information to a hash value from a root public key parsed from the certificate chain:

execute and load the second UEFI firmware in response to performing the integrity verification on the to-be-verified data by comparing the hash value from the root public key parsed from the certificate chain to the hash value of the second root public key of the second verification information.

12. The apparatus according to claim 11, wherein both the first storage area and the second storage area are one-time writing storage areas.

13. The apparatus according to claim 11, wherein the first data comprises data obtained after the third-party integrator modifies the vendor data, and the processor is further configured to execute instructions to:

obtain a public-private key pair provided by the third-party integrator; and perform the digital signature on the first data based on a private key in the public-private key pair to generate the second data and the second verification information.

14. The apparatus according to claim 11, wherein the secure boot policy is used to indicate a rule for performing the integrity verification on the second data.

15. A data integrity protection apparatus, comprising an electronic device, wherein the electronic device stores vendor data and first verification information, the first verification information is stored in a first storage area of the electronic device and the vendor data is stored on the electronic device, and the first verification information is used to perform integrity verification on the vendor data, the first verification information includes a hash value of a first root public key that corresponds to a first root private key provided by a device provider of the electronic device, the vendor data includes first unified extensible firmware interface (UEFI) firmware and a first driver, wherein the data integrity protection apparatus comprises:
    a memory; and
    a processor coupled to the memory and configured to execute instructions to:
    obtain first data that includes second UEFI firmware and a second driver;
    perform digital signature on the second UEFI firmware of the first data but not the second driver to generate second data and second verification information by using a second root private key provided by a third-party integrator;
    obtain the second verification information corresponding to the digital signature, wherein the second verification information includes a hash value of a second root public key and a secure boot policy that is used to indicate using the second verification information to perform integrity verification on the second driver, the second root public key corresponding to the second root private key;
    store the second data and the second verification information, wherein the second verification information is stored in a second storage area of the electronic device and the second data is stored on the electronic device, wherein both the first storage area and the second storage area are one-time writing storage areas;
    obtain to-be-verified data that includes the second driver; and
    in response to failing to perform integrity verification on the to-be-verified by the first verification information based on no digital signature being performed for the second driver:
        execute and load the second driver in response to performing the integrity verification on the to-be-verified data based on the secure boot policy of the second verification information.

16. The apparatus according to claim 15, wherein the second verification information comprises at least one of the following provided by the third-party integrator: a root of trust, and the secure boot policy is used to indicate a rule for performing integrity verification on the to-be-verified data.

17. The apparatus according to claim 15, wherein the processor is further configured to execute instructions to:
    before performing integrity verification on the to-be-verified data based on at least one of the first verification information and the second verification information, determine that the second storage area is in a write-protected state.

* * * * *